Fig. I.

United States Patent Office 3,502,428
Patented Mar. 24, 1970

3,502,428
PURIFICATION OF GASES
Abraham P. Gelbein, Plainfield, William G. Lloyd,
Dover, and Benjamin J. Luberoff, Summit, N.J.,
assignors to The Lummus Company, Bloomfield,
N.J., a corporation of Delaware
Filed Oct. 12, 1966, Ser. No. 586,246
Int. Cl. B01d 47/00
U.S. Cl. 23—2
19 Claims

ABSTRACT OF THE DISCLOSURE

Acid gases are removed from gaseous streams by contact with a solvent comprising (a) a 1,3-dioxo heterocyclic compound having a ring of from 5 to 6 members including two oxygen atoms bonded to a common carbon atom and (b) an alkanolamine.

---

Figure 1:
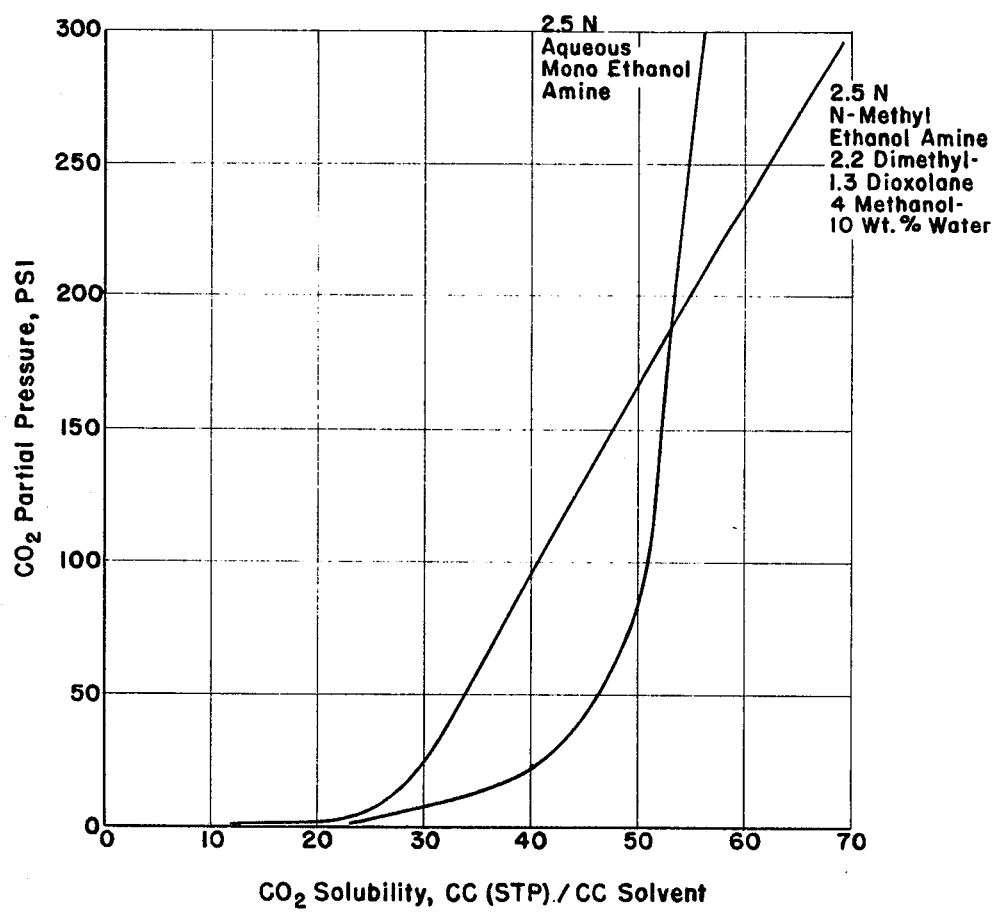

This invention relates to purification of gases, particularly gases rich in hydrogen and hydrocarbons, such as natural gas and synthesis gas, and in particular to improved solvent systems for the removal of acid gas constituents (for example $CO_2$ and $H_2S$) from streams of such gases.

Present industrial methods for the removal of acid gas constituents from such gas streams can be categorized in the following classes:

(1) Methods based on the use of a solvent which combines chemically with the acid gas, e.g., hot potassium carbonate, aqueous alkanol-amines; (2) methods based on the use of a solvent in which the acid gas dissolves but does not form a true chemical bond with the solvent, e.g., propylene carbonate, and (3) a hybrid system based on a combination of the principles used in (1) and (2), i.e., a combination of a physical and chemical solvent. Typical of the latter is the "sulfinol" process based on the use of sulfolane (tetrahydrothiophene-1,1-dioxide) admixed with a dialkanol amine.

It is generally accepted that operating costs with a purely physical solvent system become relatively more favorable than a chemical solvent system when the partial pressure of $CO_2$ in the feed and exit gases become relatively high. This arises from two factors: (1) the high $CO_2$ solution capacity of the physical solvent at superatmospheric carbon dioxide pressures and (2) the fact that thermal regeneration of the physical solvent is not required. For example, the capacity of propylene carbonate at 300 p.s.i., 80° F. is 9 ft.$^3$ $CO_2$/gal. solution compared to approximately 5 ft.$^3$/gal. for typical aqueous amine systems. Regeneration of the former can be accomplished by flashing at reduced pressure whereas the latter requires heating at relatively high temperatures with the consumption of about 200 lbs. of steam per 1000 ft.$^3$ of regenerated $CO_2$.

In addition to the requirement of high $CO_2$ feed pressures, the use of the purely physical solvent is usually also limited to process settings in which only moderate $CO_2$ separation efficiency is required. This arises from the solubility-pressure equilibrium relationships and the normally used countercurrent separation method. The best separation theoretically possible is obtained when the product gas *leaving* the top of the tower is in equilibrium with the regenerated liquid *entering* at the same point. The equilibrium partial pressure of $CO_2$ above the regenerated solvent will represent the minimum possible partial pressure of $CO_2$ in the product gas. In a practical system design this value will be relatively high for a physical solvent and very low for a chemical solvent. Thus, in terms of separation efficiency the chemical solvent is superior to the physical solvent.

Hybrid systems incorporate some of the advantages of both the physical and chemical solvents by absorbing acid gas chemically at relatively low partial pressure of $CO_2$ (or other acid gas) and physically at higher partial pressures. Such hybrid systems, however, suffer from certain disadvantages resulting from the necessity of using mutually compatible components. This necessity in many cases preclude the use of solvents having excellent absorption properties for acid gases. In addition some solvents which in other environments would be excellent absorbents for acid gases are unstable in the conditions obtaining in present industrial methods for removal of acid constituents from gas streams. An object of this invention therefore, is to provide improved products and processes for purifying gases.

Another object is to provide improved solvent compositions for the removal of acid gases from gas streams.

Still another object is to provide solvent compositions which are effective at both low and high partial pressures of acid gas constituents.

A further object is to provide such solvent systems which are stable under the conditions encountered in the industrial removal of acid gases from gas streams.

Other objects, features and advantages will become apparent from the following more complete description and claims.

In one particularly desirable embodiment, this invention contemplates a solvent composition, useful for the extraction of acid gases from gas streams, comprising in combination (a) a 1,3-dioxo heterocyclic compound characterized by a heterocyclic ring of from 5 to 6 members including two oxygen atoms bonded to a common carbon atom of said heterocyclic ring, and (b) an alkanolamine selected from the group consisting of low molecular weight monoalkanolamines, low molecular weight dialkanolamines, and low molecular weight N-alkyl alkanolamines.

In addition to the dioxane or dioxolane and the amine, water and various salts, stabilizers and catalysts may also be present, as will be apparent to those skilled in the art.

In another particularly desirable embodiment, this invention contemplates a process for removing acidic gas constituents from a gas stream, comprising in combination the steps of contacting the gas stream with a solvent comprising (a) dioxane or dioxolane, and (b) an alkanolamine selected from the group consisting of low molecular weight dialkanolamines and low molecular weight N-alkyl alkanolamines, and separating said gas stream from said solvent composition and acidic gas constituents dissolved therein.

The solvent compositions contemplated by the present invention are useful for removing acid gases such as $CO_2$, $SO_2$, $H_2S$, COS etc. from gas streams such as streams of hydrocarbon-rich gas exemplified natural gas, synthesis gas, and the like, according to methods already well known to the art. Such methods, including countercurrent vapor-liquid extraction in a packed column, countercurrent contacting in a bubble-cap tower and the like, being well known in the art, are not described in detail herein, other than by use of the generic term "contacting."

The oxygen heterocyclic contemplated herein as the principal absorbent solvent (in terms of weight percentage of the solvent composition) are generally 1,3-dioxo compounds characterized by a 5- to 6-membered heterocyclic ring. Thus, in general, the heterocyclic compounds used in the solvent systems according to the invention are characterized by the configuration

where the dotted portion of the ring represents a carbon chain of from 2 to 3 carbon atoms, together with hydrogen atoms or substituent groups attached thereto.

More specifically, typical 1,3-dioxo compounds in the compositions according to the invention are representable by one or the other of the following structural formulas:

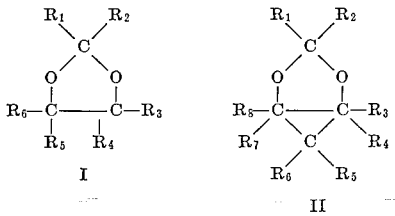

wherein $R_1$ thru $R_8$ represent hydrogen, lower alkyl groups containing 3 to 5 carbon atoms, lower alkyl groups substituted with OH, OR, phenyl or Cl groups, or unsubstituted phenyl groups, so selected that the molecular ratio of carbon atoms to oxygen atoms is between 1 and 10. When this ratio exceeds about 10, the compounds tend to be less absorptive toward acid gases in the gas stream, and also tend to be viscous liquids or even solids, thus precluding full utilization of whatever absorptive capacity they do possess.

The preferred absorbent solvents according to the present invention have molecular weights no greater than about 200. Solvents having higher molecular weights are useful in some cases, but tend to be viscous liquids or solids unsuitable for use according to the present invention.

Although all of the oxygen-containing heterocyclic compounds above described are operable in the practice of the invention, it is preferred for practical reasons to select solvents within this group which are liquids, but not excessively volatile liquids. Thus, for example while the unsubstituted dioxanes are operable solvents (all of the R groups in the above formulas being hydrogen), such unsubstituted dioxanes have relatively low boiling points (around 100° C. or less), and are not preferred because their relatively high volatility causes them to evaporate into the gas stream, so that special precautions must be taken to recover the solvent vapors from the purified gas stream and from the stripper effluent. This results in increases in both capital and operating costs. In general, depending on the operating temperature at which the absorption operation is to be carried out, it is preferred to employ substituted dioxolanes boiling well above that temperature—typically, substituted dioxolanes having boiling points in excess of about 150° C.

These compounds have been found to be surprisingly good solvents for acid gases.

Compounds of this type are readily prepared by condensing the appropriate carbonyl and glycol under acid catalysts according to well-known techniques. Typical members of this group which are suitable for acid gas removal according to this invention include:

(a) 2,2-dimethyl-1,3 - dioxolane - 4 - methanol (derived from acetone and glycerine), B.P. 189° C. at 760 mm. Hg.

(b) 2-methyl-2-ethyl-1,3 - dioxolane- 4 - methanol (derived from methyl ethyl ketone and glycerine), B.P. 65° C. at 0.3 mm. Hg.

(c) 2-methyl-2-ethyl-4-methoxymethyl - 1,3 - dioxolane (derived from methyl ethyl ketone and glycerine), B.P. 172° C. at 760 mm. Hg.

(d) 2,2,4-trimethyl-1,3-dioxane.

(e) 1,4-dioxaspiro (4,4) nonane (derived from cyclopentanone and ethylene glycol), B.P. 153° C. at 760 mm. Hg.

(f) 2-hydroxymethyl-1,4-dioxaspiro (4,4) nonane (derived from cyclopentanone and glycerine), B.P. 122° C. at 12 mm. Hg.

(g) 1,4-dioxaspiro (4,5) decane (derived from cyclohexanone and ethylene glycol), B.P. 180° C. at 760 mm. Hg.

Henry's law constants (partial pressure/concentration) at 80° F., typical of compounds in this group, are given in Table I. For comparative purposes, Henry's law constant for water is also given.

TABLE I

| | Henry's law const. (p.s.i./ft.³/ft.³) |
|---|---|
| Water | 18.4 |
| 2,2-dimethyl-1,3-dioxolane-4-methanol | 4.9 |
| 1,4-dioxaspiro (4.5) decane | 5.9 |
| 2,4-dimethyl-2-ethyl-1,3-dioxolane | 5.9 |

It is thus apparent that this class of compounds possess the requisite volatility and solubility relationships. They have not been used before probably because they are unstable in aqueous media: i.e., they hydrolyze readily to the parent glycol and carbonyl compound. Since water is usually present in the gas streams of interest, the pure forms of these compounds are not suitable for acid gas removal purposes. We have now discovered that even in the presence of substantial and useful concentrations of acid gases these compounds are hydrolytically stable when they also contain cyclic and acyclic aliphatic secondary and tertiary amines. The data in Table II on 2,2-dimethyl-1,3-dioxolane-4-methanol (DDM) demonstrates the aforementioned stability.

TABLE II

Hydrolytic stability of 1,3-dioxolanes at 100° C., 18 hours

| | Mol. percent hydrolyzed |
|---|---|
| DDM+10 wt. percent water | 60 |
| DDM+10 wt. percent water+19% N-methyl ethanol amine | Negligible |

Furthermore and surprisingly it was found that the stabilizing effect of the amine is little altered by the presence of acidic gas, e.g., $CO_2$. Thus, in addition to stabilizing the heterocyclics, it was found that at high concentrations the amines also function as excellent chemical solvent components in amine-1,3-cyclic acetal hybrid solvent systems.

Among the amines found particularly suitable for this purpose are the secondary dialkanol amines commonly used as acid gas solvents in aqueous systems, for example diisopropanol amine and diethanol amine. However, as more fully described and claimed in copending application Ser. No. 585,761, filed Oct. 11, 1966 and assigned to the assignee hereof, the viscosity of the solvent composition can be markedly reduced by using, instead of a conventional dialkanolamines, an N-alkyl-N-alkanol amine representable by the formula $R'NHRCH_2OH$, wherein R is a lower alkylene group such as methylene or ethylene, and R′ is a lower alkyl group such as methyl, ethyl or propyl. Among the particularly preferred members of this group are, for example, N-methyl-ethanolamine, N-ethyl-ethanolamine or N methyl isopropanol amine.

Because of their effect in reducing the viscosity of the solvent composition, amines of this type facilitate full utilization of the capacity of the heterocyclics for absorbing acid gases, and it is therefore preferred to use amines of this type as the amine component of the solvent composition. It will thus be seen that when used in conjunction with 1,3-dioxo heterocyclics according to the present invention, the amine fulfills two and possibly three separate functions:

(1) As in compositions heretofore proposed (e.g. those based upon glycols and the like as the physical absorbent), it functions as a chemical absorbent effective to extract acid gases from the gas stream by uniting with them chemically;

(2) It makes possible the use of 1,3-dioxo heterocyclics according to the invention, by its unexpected property of stabilizing the cyclic ether against decomposition;

(3) When the amine used is an N-alkyl alkanolamine, it also serves to reduce the viscosity of the solvent composition and thereby facilitate full use of its absorptive capacity, as more fully described and claimed in the aforesaid copending application.

Monoalkanolamines, while operable and useful in the practice of the present invention, are less advantageous than the dialkanolamines and the N-alkyl alkanolamines because they lack the outstanding stability of the latter classes of amine under the conditions contemplated herein.

The excellent acid gas solvent property of amine-1,3-dioxoheterocyclic systems is demonstrated in FIGURE 1 where the solubility equilibrium for 2.5 N,N-methylethanol amine-DDM-10 wt. percent water and conventional 2.5 N aqueous monoethanol amine systems, are compared. It is seen that at high $CO_2$ partial pressures, the equilibrium solubility is considerably greater in the amine-1,3-dioxolane system. Additionally, at moderate $CO_2$ concentrations, the amine-1,3-dioxolane system has the favorable equilibrium characteristic of the pure chemical system, i.e., essentially zero partial pressure at $CO_2$ concentrations below about 15 volumes $CO_2$/volumes of solvent. A further capacity advantage arises from the fact that in conventional aqueous amine systems normal practice is to load the solvent to about 50% of equilibrium capacity. This is done because at higher $CO_2$ concentrations, aqueous amine systems are unduly corrosive to carbon steel, and in addition foaming occurs under these conditions, thereby reducing mass transfer rates. It has been found that the amine-1,3-dioxoheterocyclic systems saturated with $CO_2$ are not corrosive towards carbon steel and there is no tendency to foam. Thus, it is possible to load such systems as close to equilibrium as desired. At moderate $CO_2$ pressures, it is therefore possible to obtain higher practical absorption capacity with the amine-1,3-dioxolane systems than with conventional aqueous amine systems.

A further advantage of amine-1,3-dioxolane systems over conventional aqueous amines is lower steam consumption for regenerating the solvent. This can be demonstrated if one considers that the primary steam cost is composed of: (1) sensible heat to raise the rich solvent temperature to the stripper temperature; (2) heat of solution; and (3) stripping steam. The first factor is directly proportional to the specific heat of the solvent. As shown in Table IV, the specific heat and heat of solution of a typical amine-1,3-dioxo system are about half that for a conventional aqueous amine system.

TABLE III.—THERMODYNAMIC PROPERTIES

| System | Sp. Heat., B.t.u./lb.,° F. | Heat of solution, b.t.u./ lb. $CO_2$ |
| --- | --- | --- |
| 2.5 N aqueous amine | 0.95 | 825 |
| 2.5 N N-methyl ethanol amine, DDM, 10 wt. percent water | 0.40 | 445 |

Figure 2:
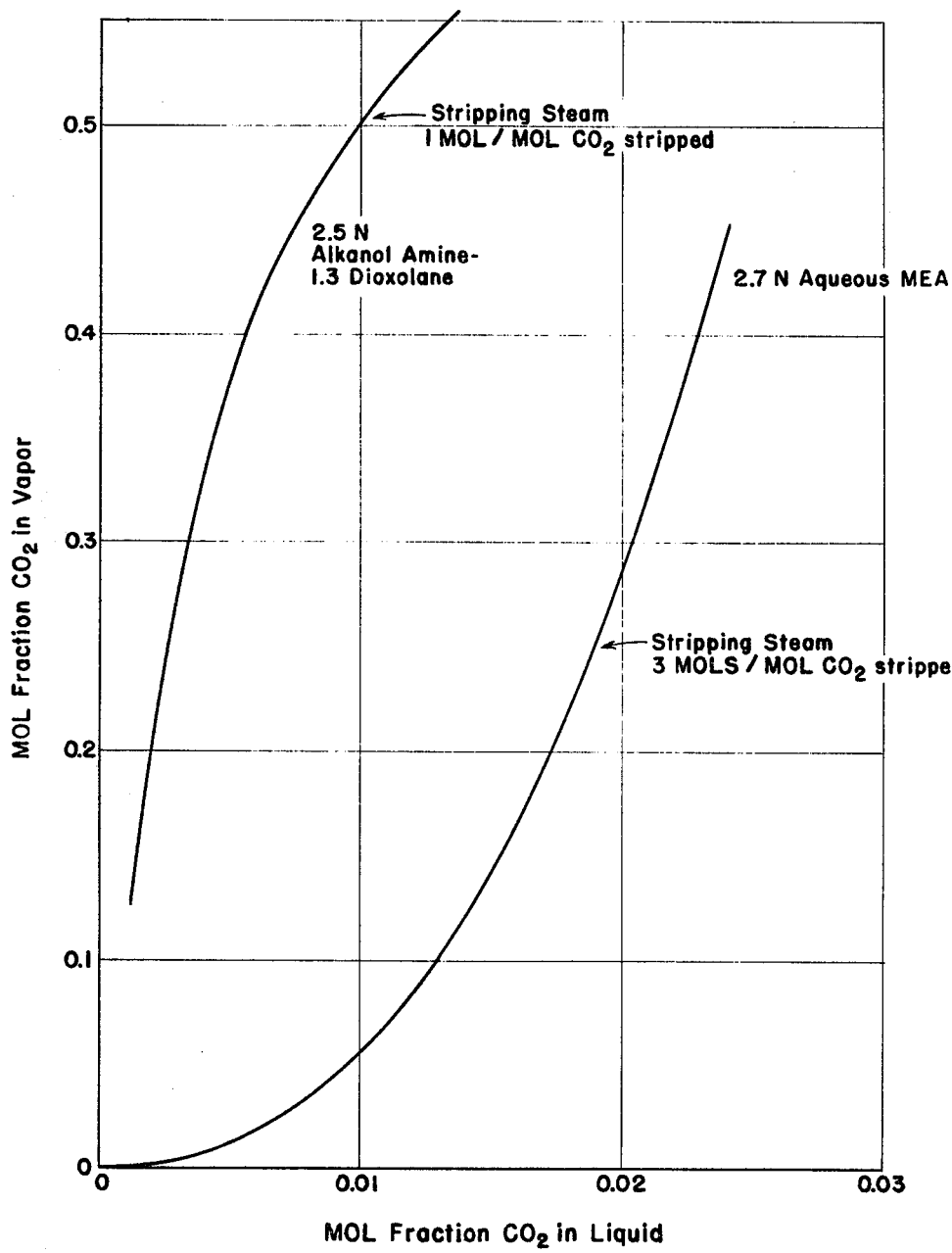

Typical stripping equilibria are shown in FIGURE 2. As can be seen, less stripping steam is required for the amine-1,3-cyclic acetal system to reduce the concentration of $CO_2$ in the lean solvent to a given level. These factors can reduce steam consumption in the amine-1,3-dioxoheterocyclic system to less than half that for conventional aqueous amine systems.

Many 1,3-dioxoheretocyclics are completely miscible with water. Therefore, they are hygroscopic and can be used to dehydrate gas streams if stabilized with amines. Furthermore, simultaneous acid gas removal and dehydration can be employed. Such a scheme has a unique advantage in that the water picked up by the solvent can function as the stripping vapor needed for solvent regeneration. If the feed gases are essentially dry then water can be incorporated as part of the solvent system for use in stripping. Alternatively, the solvent system can be essentially anhydrous and open steam can be used for regeneration.

The separation of the enriched solvent from the purified gas stream is carried out according to conventional methods appropriate to the apparatus selected for contacting, and is not described in detail. In general, such separation is carried out by passing the gas-liquid mixture into one or more vapor-disengaging zones, wherein the liquid collects at the bottom and is drawn off therefrom, while the vapor is drawn off from the vapor space at the top of the disengaging zone. In a packed tower or bubble-cap tower, for example, using countercurrent flow with the solvent passing downwardly, such a vapor-disengaging zone may take the form of an enclosed, unpacked zone below the packed zone (or below the lowermost bubble tray), having a dished bottom with a central, valved outlet through which accumulated enriched solvent may be withdrawn, while disengaged vapor together with fresh feed gas passes upwardly through the column.

The stripping operation is also carried out according to conventional techniques, and need not be described in detail. In accordance with conventional practice, such stripping can be done with steam, wherein steam is either passed into the enriched solvent or generated in situ by heating the solvent to vaporize water contained therein, or an inert, insoluble gas may be used to dilute the $CO_2$. As the stripping gas passes off from the solvent, it carries dissolved volatile materials, such as $CO_2$, $H_2S$ etc., along with it.

In order to illustrate more fully the nature of the present invention and the manner of practicing the same, the following examples are presented:

Examples 1 and 2

To demonstrate the efficient mass transfer characteristics of this class of solvents, a column, with an $L/D$ (length/diameter ratio) of 24, packed with helices whose diameter was ¼ that of the column was used. Suitable connections were added for introducing fresh solvents at the top of the column and withdrawing enriched solvent from the bottom thereof, and for introducing fresh feed gas at the bottom of the column and drawing off and collecting the purified gas at the top of the column.

A feed gas containing carbon dioxide was fed into the column and passed upwardly therethrough, which solvent was simultaneously passed downwardly through the column. The enriched solvent and the purified gas were collected and analyzed to determine the effectiveness of the absorption of $CO_2$ by the solvent. Further operating details and the results obtained are given in Table IV below:

TABLE IV.—COUNTERCURRENT ABSORPTION OF $CO_2$

| Solvent system | Feed, 50 mol. percent $CO_2$ total pressure, 1 atm.; temperature, 40° C. | | Mass transfer Coefficient. lb. mols/hr, ft.$^3$ atm. |
| --- | --- | --- | --- |
| | Gas feed, lb. mols/hr.- ft.$^2$ | Solvent feed, lb. mols/hr.- ft.$^2$ | |
| 2.5 N aqueous monoethanolamine (for comparison) | 0.67 | 0.56 | 0.9 |
| 2.5 N N-methyl ethanol amine, DDM, 10 wt. percent water (Example 1) | 0.67 | 0.57 | 0.7 |
| 5.0 N N-methyl ethanol amine, DDM, 10 wt. percent water (Example 2) | 1.24 | 1.14 | 2.2 |

The above results indicate that the $CO_2$ was rapidly and efficiently absorbed, and that the mass transfer rates of such absorption are comparable to those of conventional aqueous amine system. In fact, the mass transfer rates in many cases are considerably better than those that can be achieved using conventional aqueous amine solutions, as indicated by Example 2. This factor together with the higher capacities of the solvents of this invention, as noted elsewhere herein, is reflected in lower solvent recirculation and shorter absorption towers, and therefore results in lower capital costs and also lower operating costs for the amine-1,3-cyclic acetal systems, as compared with conventional absorbing solvents.

Example 3

A solution containing 3.5 moles per liter of N-methyl ethanol amine in 2,2-dimethyl-1,3-dioxolane-4-methanol, which also contained about 10% water, based on the weight of the total solvent composition, was used to scrub a hydrogen stream containing 20 vol. percent $CO_2$ in a continuous absorb/desorb system. The $L/D$ of the absorber was 30 and the packing (Raschig rings) was ⅛ the column diameter. The liquor flow rate was 275 gals./hr. ft.² and the gas rate was 6800 s.c.f.h./ft.². The column was operated at 300 p.s.i.g with a bottoms temperature of 161° F. and a tops temperature of 100° F.

Under these conditions, there was no detectable $CO_2$ in the product gas. Total recovery of the $CO_2$ was effected in the stripper which was operated in a conventional way. The composition and efficacy of the solvent in this continuous system was unchanged after prolonged operation.

The foregoing examples are illustrative. Substantially identical manipulative procedures may be used to extract acid gases from gas streams, using the other solvent compositions contemplated according to the invention, for example using other 1,3-dioxo heterocyclic compounds such as those listed in column 3, and other amines such as the monoalkanolamines and dialkanolamines mentioned elsewhere herein.

The ratio of amine to organic solvent in the solvent compositions according to this invention may be varied over rather wide limits, for example from about 0.1 to 10 mols of amine per liter of organic solvent. Preferably, the amine is present in concentration between about 2 and 5 moles/liter, with respect to the organic components of the solvent, disregarding the water content, if any.

While this invention has been described in terms of certain preferred embodiments, and illustrated by way of certain examples and drawings, these are illustrative only, as many alternatives and equivalents will readily occur to those skilled in the art, without departing from the spirit or proper scope of the invention. The invention is therefore not to be construed as limited, except as set forth in the appended claims.

What is claimed is:

1. A solvent composition useful for the extraction of acid gases from gas streams, comprising in combination (a) a 1,3-dioxo heterocyclic compound having a boiling point of at least about 150° C. and characterized by a heterocyclic ring of carbon and oxygen atoms, having from 5 to 6 members including two oxygen atoms bonded to a common carbon atom of said heterocyclic ring, and (b) an alkanolamine selected from the group consisting of low molecular weight monoalkanolamines, low molecular weight dialkanolamines, and low molecular weight N-alkylalkanolamines.

2. A solvent composition according to claim 1, further comprising water in amount up to about 20% by weight of said composition.

3. A solvent composition according to claim 1, wherein said amine is present in amount between about 0.1 and about 10 mols of amine per liter of said heterocyclic compound.

4. A solvent composition according to claim 1, wherein said amine is present in concentration between about 2 and about 5 moles per liter of organic solvent.

5. A solvent composition according to claim 1, wherein said heterocyclic compound is characterized by a 5-membered ring comprising three carbon atoms and two oxygen atoms.

6. A solvent composition according to claim 5, wherein said heterocyclic compound is 2,2-dimethyl-1,3-dioxolane-4-methanol.

7. A solvent composition according to claim 1, wherein said amine is an N-alkylmonoalkanolamine.

8. A solvent composition according to claim 7, wherein said N-alkylmonoalkanolamine is N-methylethanolamine.

9. A solvent composition according to claim 7, wherein acid N-alkylmonoalkanolamine is N-ethylethanolamine.

10. A process for removing acid gas constituents from a gas stream, comprising in combination the steps of contacting said gas stream with a liquid solvent composition comprising (a) a cyclic organic compound characterized by a heterocyclic ring of carbon and oxygen atoms, having from 5 to 6 members including two oxy oxygen atoms bonded to a common carbon atom of said heterocyclic ring, and (b) an alkanolamine selected from the group consisting of low molecular weight monoalkanolamines, low molecular weight dialkanolamines and low molecular weight N-alkylalkanolamines, and separating said gas stream from said solvent composition and acidic gas constituents dissolved therein.

11. A process according to claim 10, wherein said acidic gas constituents dissolved in said solvent are separated from said solvent, thereby producing a regenerated solvent, and said regenerated solvent is used for the removal of additional acid gas constituents from a further quantity of gas containing the same.

12. A process according to claim 10, wherein said solvent composition further comprises water in amount up to about 20% by weight of said composition.

13. A process according to claim 10, wherein said amine is present in amount between about 0.1 and about 10 mols of amine per liter of said heterocyclic compound.

14. A process according to claim 10, wherein said amine is present in concentration between about 2 and about 5 moles per liter of organic solvent.

15. A process according to claim 10, wherein said heterocyclic compound is characterized by a 5-membered ring comprising three carbon atoms and two oxygen atoms.

16. A process according to claim 15, wherein said heterocyclic compound is 2,2-dimethyl-1,3-dioxolane-4-methanol.

17. A process according to claim 10, wherein said amine is an N-alkylmonoalkanolamine.

18. A process according to claim 17, wherein said N-alkylmonoalkanolamine is N-methylethanolamine.

19. A process according to claim 17, wherein acid N-alkylmonoalkanolamine is N-ethylethanolamine.

References Cited

UNITED STATES PATENTS

| | | | |
|---|---|---|---|
| 2,139,375 | 12/1938 | Millar et al. | 23—2 X |
| 2,600,328 | 6/1952 | Riesenfeld et al. | 23—3 |
| 3,387,917 | 6/1968 | Walles et al. | 23—2 |

FOREIGN PATENTS

| | | |
|---|---|---|
| 734,577 | 8/1953 | Great Britain. |

OSCAR R. VERTIZ, Primary Examiner

E. C. THOMAS, Assistant Examiner

U.S. Cl. X.R.

55—68, 73; 252—189